(12) United States Patent
Lollis et al.

(10) Patent No.: US 8,540,103 B2
(45) Date of Patent: Sep. 24, 2013

(54) CLOSURE FOR PRESSURE VESSELS

(76) Inventors: Jack D Lollis, Tulsa, OK (US); Corey M Lollis, Tulsa, OK (US); Richard A Howerton, Tulsa, OK (US)

( * ) Notice: Subject to any disclaimer, the term of this patent is extended or adjusted under 35 U.S.C. 154(b) by 159 days.

(21) Appl. No.: 13/022,037

(22) Filed: Feb. 7, 2011

(65) Prior Publication Data

US 2011/0192848 A1    Aug. 11, 2011

Related U.S. Application Data

(60) Provisional application No. 61/302,253, filed on Feb. 8, 2010.

(51) Int. Cl.
  *B65D 45/16* (2006.01)
  *B65D 45/00* (2006.01)
  *E05B 65/00* (2006.01)

(52) U.S. Cl.
  USPC .................. 220/324; 220/243; 292/256.5

(58) Field of Classification Search
  USPC ................. 220/324–327, 243–252, 835, 360, 220/367.1; 292/256.5
  See application file for complete search history.

(56) References Cited

U.S. PATENT DOCUMENTS

| | | | | |
|---|---|---|---|---|
| 1,765,207 A | * | 6/1930 | Coffee | 292/37 |
| 2,063,213 A | * | 12/1936 | Wirz | 220/251 |
| 3,173,572 A | * | 3/1965 | Beecher | 220/323 |
| 3,806,303 A | | 4/1974 | Green | |
| 4,122,969 A | | 10/1978 | Hugley | |
| 4,135,640 A | | 1/1979 | MacQuilkin | |
| 4,173,292 A | | 11/1979 | Malacheski | |
| 4,195,457 A | | 4/1980 | Filser | |
| 4,237,936 A | * | 12/1980 | Lollis et al. | 138/90 |
| 4,307,818 A | * | 12/1981 | Singh et al. | 220/316 |
| 4,365,726 A | | 12/1982 | Broderick | |
| 4,422,651 A | | 12/1983 | Platts | |
| 4,467,936 A | * | 8/1984 | Makhijani | 220/246 |
| 4,483,458 A | | 11/1984 | Minning | |
| 4,489,850 A | | 12/1984 | Reneau | |
| 4,565,297 A | | 1/1986 | Korner | |
| 4,739,899 A | | 4/1988 | Thompson | |
| 4,750,635 A | | 6/1988 | Piegza | |
| 4,789,077 A | | 12/1988 | Noe | |
| 4,823,976 A | | 4/1989 | White | |
| 5,127,535 A | | 7/1992 | Shinno | |
| 5,148,938 A | * | 9/1992 | Morgan, Jr. | 220/316 |
| 5,433,334 A | | 7/1995 | Reneau | |
| 5,657,892 A | | 8/1997 | Bolli | |
| 5,720,411 A | | 2/1998 | Darby | |
| 5,768,258 A | | 6/1998 | Van As et al. | |
| 6,199,261 B1 | | 3/2001 | Slais | |

(Continued)

*Primary Examiner* — Mickey Yu
*Assistant Examiner* — Shawn Braden

(57) ABSTRACT

A closure for pressure vessels provides ease in access to the inside of a pressure vessel and at the same time provides a tight pressure seal for the closure. The closure for pressure vessels includes a hub adapted to fit on to an opening on the pressure vessel, a door connected to the hub, a hinge assembly to secure the door to the hub, and a locking assembly attached to the door. The locking assembly includes a slide lock operating around a central support, a plurality of locking lug arms radially operating around the central support, a pressure alert valve connected to the door, and a handle connected to the slide plate operating around the central support. The handle moves the locking assembly from a locking position to an unlocking position as the result of the groove pattern machined in the back of the slide plate.

10 Claims, 3 Drawing Sheets

(56) References Cited

U.S. PATENT DOCUMENTS

| | | |
|---|---|---|
| 6,206,227 B1 | 3/2001 | Ferri |
| 6,230,921 B1 | 5/2001 | Berglund |
| 6,293,051 B1 * | 9/2001 | Matye .............................. 49/395 |
| 6,763,570 B2 | 7/2004 | Abbott |
| 6,851,452 B2 * | 2/2005 | Smith ............................. 138/89 |
| 7,341,161 B2 | 3/2008 | McGuire |
| 2008/0190925 A1 | 8/2008 | Ambriz |

* cited by examiner

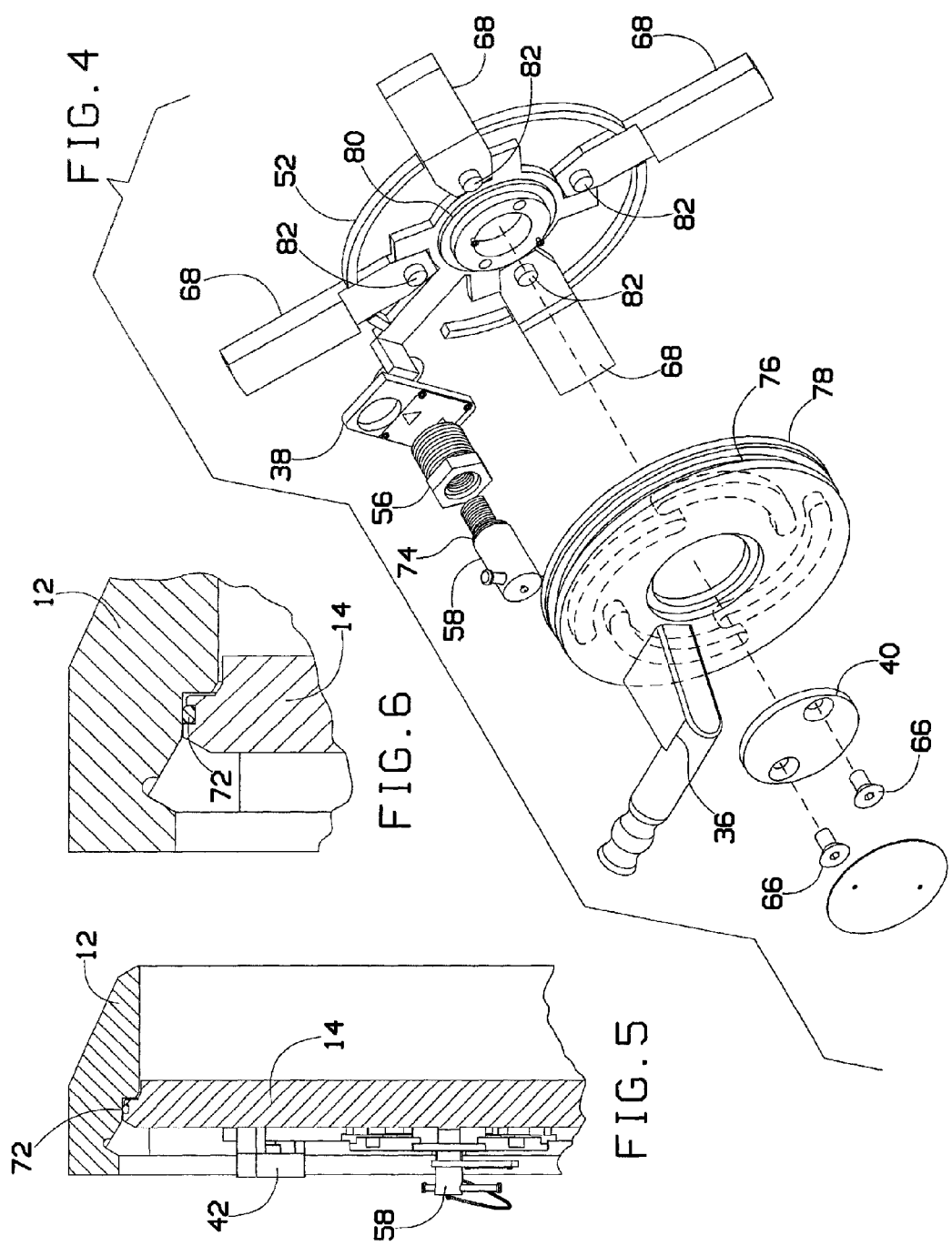

CLOSURE FOR PRESSURE VESSELS

CROSS-REFERENCE TO RELATED APPLICATIONS

This application claims the benefit of Provisional Application No. 61/302,253 filed Feb. 8, 2010, the contents of which are incorporated herein by reference.

BACKGROUND OF THE INVENTION

The present invention generally relates to a closure for a pressure vessel. More specifically, the present invention relates to a closure for pressure vessels that provides easy access to the interior of the vessel, while allowing a tight seal for the closure and enhancing of safety during operation.

Currently, closure devices used to close pressure vessels utilize a plurality of evenly spaced lug bolts around the perimeter of the closure to provide tight sealing engagement. Unfortunately, these types of closures require considerable time and effort to tighten and loosen each bolt during the engagement and disengagement process. Furthermore, failure to properly tighten the bolts correctly results in unwanted leakage.

As can be seen, there is a need to provide a closure for pressure vessels that provides easy access to the interior of the vessel and, at the same time, provides an improved safety and a tight fitting seal for the closure.

SUMMARY OF THE INVENTION

In one aspect of the present invention, a closure for a pressure vessel including a hub adapted to fit on to an opening on the pressure vessel, a door connected to the hub, a hinge assembly to secure the door to the hub, a locking assembly attached to the door, the locking assembly includes a slide lock having a central support, a plurality of locking lug arms radially connected to the central support, a pressure alert valve connected to the central support, and a handle connected to the central support, the handle moves the locking assembly from a locking position to an unlocking position.

In another aspect of the present invention, a closure for a pressure vessel including a hub adapted to fit on to an opening on the pressure vessel, a door connected to the hub, a hinge assembly to secure the door to the hub, a locking assembly attached to the door, the locking assembly includes a slide lock having a central support, a plurality of locking lug arms radially connected to the central support, a pressure alert valve connected to the central support, and a handle connected to the central support, each locking lug arm is guided inside a groove on the hub by a lug bushing, the handle moves the locking lug arms from a locking position on which the locking lugs are seated into the grooves of the hub to an unlocking position on which the locking lug arms are out of the grooves of the hub.

These and other features, aspects and advantages of the present invention will become better understood with reference to the following drawings, description and claims.

BRIEF DESCRIPTION OF THE DRAWINGS

FIG. 4 illustrates an exploded view of the closure locking assembly for pressure vessels of FIG. 1;

FIG. 5 illustrates a cross-sectional view of the closure for pressure vessel of FIG. 1 showing an o-ring seal when the closure is in the closed position; and FIG. 6 illustrates a detailed view of the o-ring of FIG. 5.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally provide a closure for pressure vessels that provides ease in access to the inside of a pressure vessel and at the same time provides a tight pressure seal for the closure.

Figure 1:
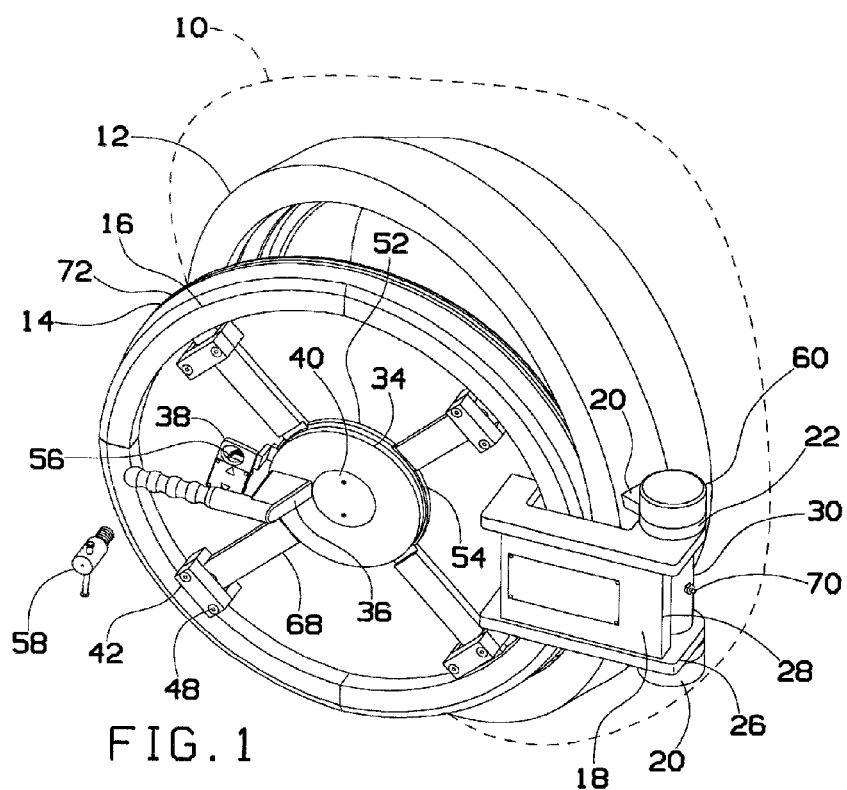
FIG. 1 illustrates a perspective front view of a closure for pressure vessels according to an exemplary embodiment of the present invention showing the closure in the open position.

FIG. 1 illustrates a closure 10 for a pressure vessel (not shown). The closure 10 may include a hub 12 adapted to be connected to an opening on a pressure vessel (not shown), a door 14, a hinge assembly 18 to connect the hub 12 and the door 14, and a lock assembly 16.

The closure may be quickly opened and closed to provide for access to the interior of the pressure vessel 12 for inspection, filter element replacement, loading pipeline scraper or inspection devices, or other maintenance or service.

The closure 10 may be constructed of a durable metal. In one embodiment, the closure 10 may be made of steel. The size of the closure 10 may depend on the size of the pressure vessel (not shown).

The hub 12 may be connected to the outside of the pressure vessel (not shown). In some embodiments, the hub 12 may be directly welded to the outside of the pressure vessel (not shown). In some embodiment the hub 12 may be welded to a flange (not shown) and secured to the pressure vessel (not shown). The thickness of the hub 12 may depend on the working pressure and temperature of the pressure vessel (not shown).

The door 14 may be attached to the hub 12 by a hinge assembly 18. The thickness of the door 14 may depend on the working pressure and temperature of the pressure vessel. In some embodiment, the door 14 may be machined to fit inside the hub 12. In some embodiment, the hub 12 may include an internal groove to receive the door 14. A door o-ring 72 may be placed between the hub 12 and the door 14 to insure a good pressure seal.

The hinge assembly 18 may mount the door 14 to the hub 12 and facilitate swinging movement of the door 14 relative to the hub body. In one embodiment, the hinge assembly 18 may be connected to the door 14 and hub 12 by welding to either the right or left side of the closure 10 providing a right or left opening.

Figure 2:
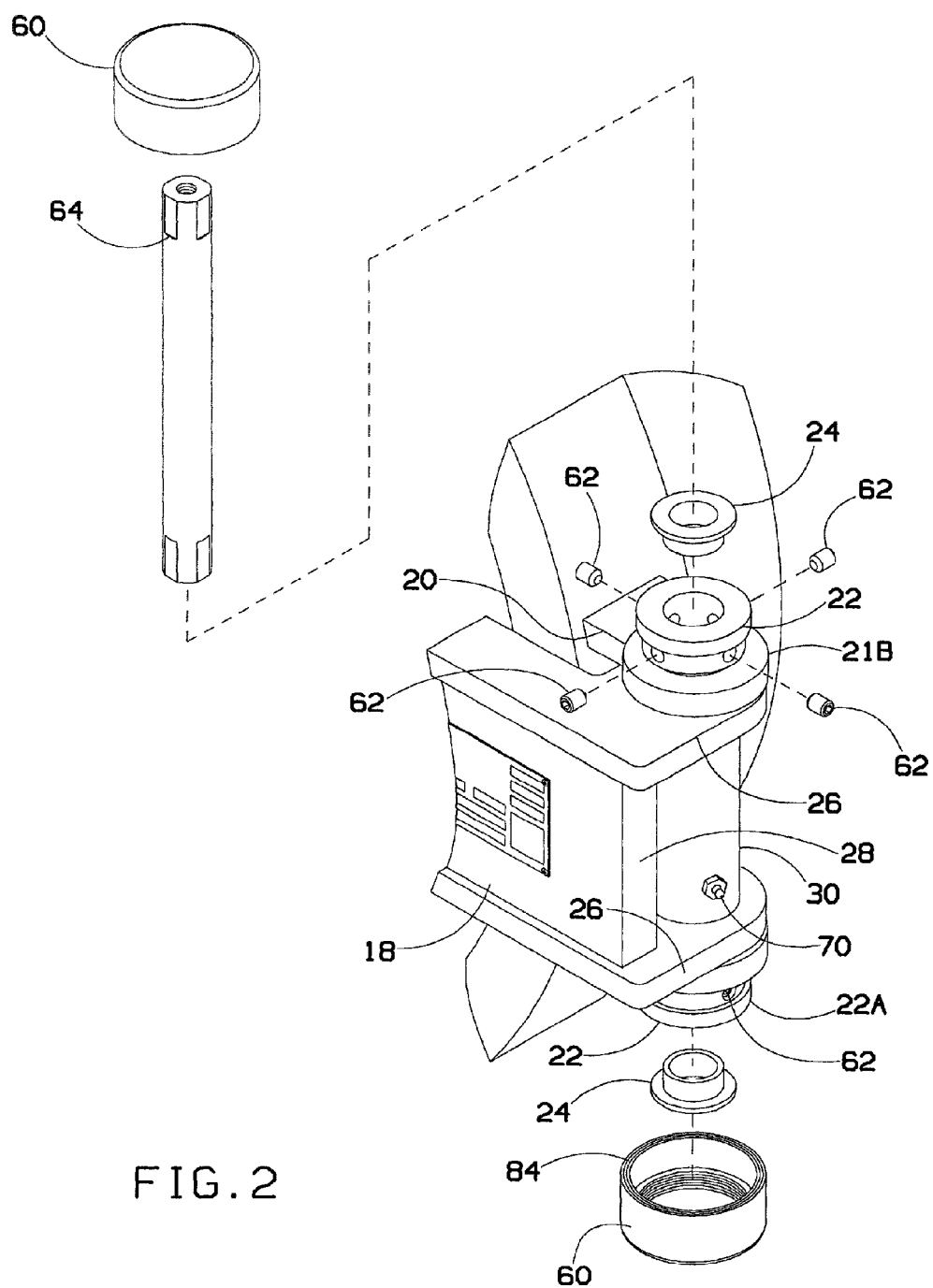
FIG. 2 illustrates an exploded view of a hinge of FIG. 1.

The hinge assembly 18 may include a gusset plate 28 placed between upper and lower arm plates 26 forming an upper hinge 21b and a lower hinge 21a respectively. A vertical tubular tube 30 may be connected between plates 26. A lubrication fitting 70 may be attached to the tubular tube 30 to maintain the lubrication inside the tubular tube 30. The upper hinge 21b and the lower hinge 21a may include a hinge adjustment assembly 22 situated at each one of the ends of the tubular tube 30. A pin 64 may be slid through the upper bushing assembly 21b and the tubular tube 30, until seating on the lower bushing assembly 21a. Adjustment of the hinge assembly 18 may be performed by adjustment screws 62 located on the upper and lower hinge adjustment assemblies 22. The number of adjustment screws 62 may depend on the size of the hinge assembly 18. In one embodiment, the hinge assembly may have eight adjustment screws 62. Each bushing assembly 22 may be protected by a hinge cap 60. Each hinge cap 60 may include a seal ring 84 to provide a tight seal to the hinge assembly 18 (FIG. 2).

FIG. 4 illustrates a detailed view of the lock assembly 16 according to an exemplary embodiment of the present invention. The lock assembly 16 may be operatively connected to the door 14. The locking assembly 16 may include a slide lock 34 which includes a central support 80, a plurality of locking lug arms 68 distributed radially around the central support 80, and a seal ring 54. The central support 80 may be rotatably mounted into the slide lock 34.

The handle 36 may be used to rotate the central support 80 which then moves the locking lug arms 68 from a locking position (inside recessed groove on the hub 12) to an unlocking position (outside recessed groove on the hub 12). The handle 36 may be connected to a slide plate 76. In some embodiments, the handle 36 may be welded to the slide plate 76. The center cap 40 may be attached to the center support 80 by fasteners 66. The slide plate 76 may have grooves machined into it to allow the safety lock pins 82 to track during the movement of the handle 36 through the locking and unlocking operations of the device. A lock seal 78 may be included. The center support 80 and the slide lock pins 82 will be protected by the lock seal 78.

Figure 3:
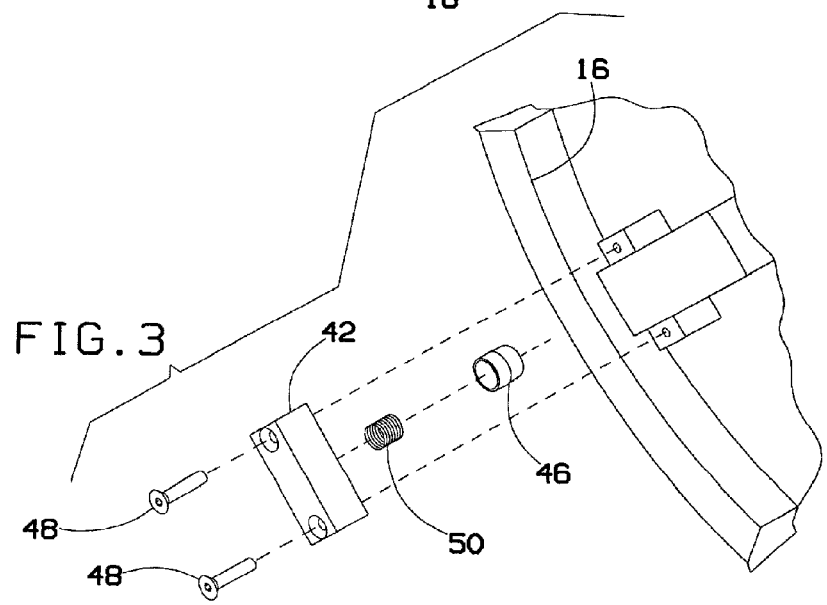
FIG. 3 illustrates an exploded view of a locking lug device of FIG. 1.

The underside of the slide plate 76 may have grooves machined that may accept the slide lock pins 82. As the handle 36 may be moved from the locked to unlocked position the slide lock pins 82 track along these groves causing the locking lug arms 68 to lock and unlock the closure. Each locking lug arm 68 may be guided into position by a lug bushing housing 42. Each lug bushing housing 42 may have a lug bushing 46, a spring 50, and lug bushing bolts 48 (FIG. 3). The lug bushings 46, the spring 50, and lug bushing bolts 48, may work together to insure the smooth operation of the locking lug arms 68.

The safety lock 38 pivots around the center support 80. The safety lock 38 may include a pressure alert bushing 56 operatively connected to a pressure alert valve 58, both which are operatively connected to the door 14. The pressure alert valve 58 may include a o-ring seal 74 to ensure proper seal of the pressure alert valve 58.

The locking and unlocking of the closure 10 may be achieved by turning the handle 36, which in turn may rotate the slide plate 76, moving the slide lock pins 84 along the machined groove in the slide plate 76. The closure 10 may be protected from accidental opening under pressure by the safety lock 38 and the pressure alert valve 58. The locking lugs 16 may not move until the pressure alert valve 58 is removed and the safety lock 38 is moved to the unlocked position.

The safe operation of the closure 10 may be incremented by the safety lock 38 and the pressure alert valve 58. The safety lock 38 secures the locking lug arms 68 and requires the removal of the pressure alert valve 58 prior to the unlocking of the door 14. The user may detect any abnormality on the pressure vessel as the pressure alert valve 58 is disconnected.

To open the closure 10, the pressure alert valve 58 may be removed from the pressure alert bushing 56. After removal of the pressure alert valve 58, the safety lock 38 may be moved to the unlocked position. Only after these two steps the door handle 36 may be move counter clock wise to physically unlock and move the locking lugs 16 from the locking position in the corresponding recessed groove machined into the hub 12.

To lock the closure, the door 14 may be closed, seating the door o-ring 72. The door handle 36 may then be moved to the right which correspondingly causes the slide lock pins 84 to follow the grooves machined in the back of the slide plate 76, which in turn may move the locking lug arms 68 outboard. The corresponding locking lugs 16 may be moved into the recessed grove in the door 14. When the locking lugs 16 are fully seated in the door 14, then the safety lock 38 may be moved to the locked position. When the safety lock 38 is aligned with the pressure alert valve bushing 56 only then may the pressure alert valve 58 be reinstalled passing thru the safety lock 38 into the pressure alert bushing 56.

FIGS. 5 and 6 illustrate a cross-sectional view of the closure for pressure vessel of FIG. 1 showing an o-ring seal when the closure is in the closed position.

The closure 10 may provide ease of operation, improved sealing, and greater safety than the prior art closure systems. The locking lugs 16 in conjunction with the groove to hold the o-ring seal 72 in the door 14 may provide a sound pressure seal. The slide lock 38 and integrated handle 36 may provide an ease of operation that does not require the removal of any heavy or cumbersome equipment to access the inside of the pressure vessel.

It should be understood, of course, that the foregoing relates to exemplary embodiments of the invention and that modifications may be made without departing from the spirit and scope of the invention as set forth in the following claims.

What is claimed is:

1. A closure for a pressure vessel, comprising:
   a hub adapted to fit on to an opening on the pressure vessel,
   a door connected to the hub;
   a hinge assembly to secure the door to the hub;
   a locking assembly attached to the door;
   wherein the locking assembly includes a slide lock having a central support, a plurality of locking lug arms radially connected to the central support, and a handle connected to a slide plate attached to the central support;
   wherein the handle moves the locking assembly from a locking position to an unlocking position; and,
   a pressure alert valve removably connected to the central support, wherein when the pressure alert valve is connected to the central support, the locking lug arms are prevented from moving.

2. The closure according to claim 1, further including a sealing ring placed between the door and hub.

3. The closure according to claim 1, wherein the door fits into a groove inside the hub.

4. The closure according to claim 1, wherein the hinge assembly includes:
   a gusset plate placed between an upper arm plate and a lower arm plate forming an upper hinge and a lower hinge;
   a vertical tubular tube connected to the upper hinge and the lower hinge, wherein the upper hinge and the lower hinge include a bushing assembly;
   a pin sliding through the upper hinge, the tubular tube, until seating on the lower hinge; and
   adjustment screws connected to the upper and the lower hinge.

5. A closure for a pressure vessel, comprising:
   a hub adapted to fit on to an opening on the pressure vessel;
   a door connected to the hub;

a hinge assembly to secure the door to the hub; and a locking assembly attached to the door, wherein the locking assembly includes a slide lock operating around a central support, a plurality of locking lug arms radially actuated by the movement of a door handle, the door handle being connected to a side plate attached to the central support, wherein the plurality of locking lug arms are connected to the central support, wherein each locking lug arm is guided inside a groove on the hub by a lug bushing;

wherein the door handle moves the locking lug arms from a locking position on which the locking lugs are seated into the grooves of the hub to an unlocking position on which the locking lug arms are out of the grooves of the hub; and, a pressure alert valve removably connected to the central support, said pressure alert value preventing movement of the locking lug arms when so connected to the central support.

6. The closure of claim 5, wherein each lug bushing includes a spring and lug bushing bolt.

7. The closure according to claim 5, further including an O-ring seal placed between the door and hub.

8. The closure according to claim 5, wherein the door fits into a groove inside the hub.

9. The closure according to claim 8, wherein when the handle moves from a locked position to an unlocked position, slide lock pins track along the grooves causing the locking lug arms to lock and unlock the closure.

10. The closure according to claim 5, wherein each locking lug arm is guided into position by a lug bushing housing, wherein the bushing housing includes a lug bushing, a spring, and lug bushing bolts.

* * * * *